United States Patent [19]

Siegel

[11] Patent Number: 5,031,969
[45] Date of Patent: Jul. 16, 1991

[54] APPARATUS FOR PRESSURE REGULATION IN A HYDRAULIC SYSTEM

[75] Inventor: Heinz Siegel, Stuttgart, Fed. Rep. of Germany

[73] Assignee: Robert Bosch GmbH, Stuttgart, Fed. Rep. of Germany

[21] Appl. No.: 444,246

[22] Filed: Dec. 1, 1989

[30] Foreign Application Priority Data

Feb. 11, 1989 [DE] Fed. Rep. of Germany ....... 3904132

[51] Int. Cl.$^5$ .............................................. B60T 8/42
[52] U.S. Cl. ..................................... 303/113; 303/87
[58] Field of Search .................. 303/87, 113, 114, 115, 303/116, 119

[56] References Cited

U.S. PATENT DOCUMENTS

| 4,395,073 | 7/1983 | Arikawa | 303/116 |
| 4,807,945 | 2/1989 | Budecker et al. | 303/87 X |
| 4,812,777 | 3/1989 | Shirai | 303/87 X |

FOREIGN PATENT DOCUMENTS 2643860 3/1978 Fed. Rep. of Germany .
1590003 5/1981 United Kingdom .

Primary Examiner—Duane A. Reger
Attorney, Agent, or Firm—Edwin E. Greigg

[57] ABSTRACT

The invention relates to an apparatus for pressure regulation in hydraulic systems, in particular in anti-skid systems of vehicle brake systems. According to the invention, a throttle switchover valve that includes a bypass valve and a throttle assembly is disposed in the brake circuit between a damper chamber and the master cylinder. The throttle switchover valve either creates an unhindered passage for the brake fluid or throttles it, depending on the intensity of the brake pressure. This suppresses pulsations transmitted to the foot pedal, yet nevertheless, rapid braking and fast release of the brake of a motor vehicle are assured.

24 Claims, 2 Drawing Sheets

APPARATUS FOR PRESSURE REGULATION IN A HYDRAULIC SYSTEM

BACKGROUND OF THE INVENTION

The invention relates to an apparatus for pressure regulation in a hydraulic system, in particular in vehicle anti-skid braking systems (ABS).

Such equipment is found in vehicle brake systems that have ABS. The vehicle brake systems are mounted at the wheels of the vehicle and provided with brake pressure lines that lead to the hydraulic brake system. To generate braking pressure and hence the braking action, a master brake cylinder is actuated using a foot pedal. Modern vehicles have ABS systems built in as well, which also generate a brake pressure for automatically adapted braking in anti-skid operation. To this end, sensors are mounted adjacent the wheels to indicate the danger of skidding, and via a control unit they control a motor, return pump and magnetic regulating valve, for example, to produce suitable pressure changes in the brake lines compared with the pressure of the master brake cylinder. Equalizing the pressure in the master brake cylinder produces pulsations that can be felt by the driver at the foot pedal.

German Offenlegungsschrift 31 07 963 discloses a brake fluid pressure control apparatus for ABS systems. This apparatus provides a pressure fluid supply line between the master cylinder and the control valve. To eliminate a brake pedal feedback caused by pressure changes, check valves are disposed in the brake system and a bypass line having a thottling action is provided. Despite the provision of such throttle restrictions in the brake system, however, perceptible pulsations do reach the vehicle brake pedal. The metal, rigid-pressure damper chamber known from German Offenlegungsschrift 26 43 860 is likewise incapable of adequately eliminating the pulsations that arise.

OBJECT AND SUMMARY OF THE INVENTION

In an apparatus of the type defined at the outset above, a pulsation arising at the foot pedal is eliminated by the system set forth herein.

Disposing a throttle switchover valve between the damper chamber and the master cylinder of the ABS in the hydraulic system of the vehicle brake system affords flexibility in regulating a pressure reduction or buildup as needed for effective braking of the vehicle and for freedom of pulsation for the foot pedal. In a braking event in which a brake pressure of not more than 10 bar is built up, the brake pressure supplied finds an unthrottled open passage through the throttle switchover valve. On the other hand, if a brake pressure of more than 10 bar is generated in the master cylinder, then the throttle switchover valve is moved into a second position, and when the return of the brake fluid begins, the brake fluid is throttled in its passage through the throttle switchover valve, so that any pressure pulsation arising at the foot pedal is reduced to a minimum or even completely eliminated. In fast braking, direct communication with the wheel cylinders is established via a bypass valve located in the throttle switchover valve, so that a rapid buildup of pressure is attained. In the ABS control situation, the return pump pumps brake fluid directly from the wheel cylinders via the regulating valves upon pressure buildup. Additional volume can also be positively displaced in the return direction by the master cylinder at any time, via a bypass valve.

A pre-stressed spring accumulator at the damper chamber also contributes to reducing the pressure pulsation. It serves to equalize both the pressure volume and the pressure pulsation. It is advantageous that the fluctuations can be compensated for by way of the compressibility of the pressure fluid without requiring a relatively large damper chamber. If the driver relieves the master cylinder, then the throttle switchover valve returns to its initial position and makes a rapid pressure reduction possible.

Since the throttle switchover valve may be embodied as either a line valve or a screw-in valve, there is no need to modify a conventional ABS unit. The throttle switchover valve according to the invention can instead be provided by retrofitting.

By embodying large throttle bores in the throttle assembly of a throttle switchover valve and providing an annular groove on a face end of a stepped piston present in the throttle switchover valve remote from a cap element, the throttle switchover valve in a flat seat of the stepped piston is protected against being vulnerable to dirt. This is necessary, since an unthrottled open passage for the brake fluid is opened up when even the smallest openings exist between the housing of the throttle swithover valve and the stepped piston located in it.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
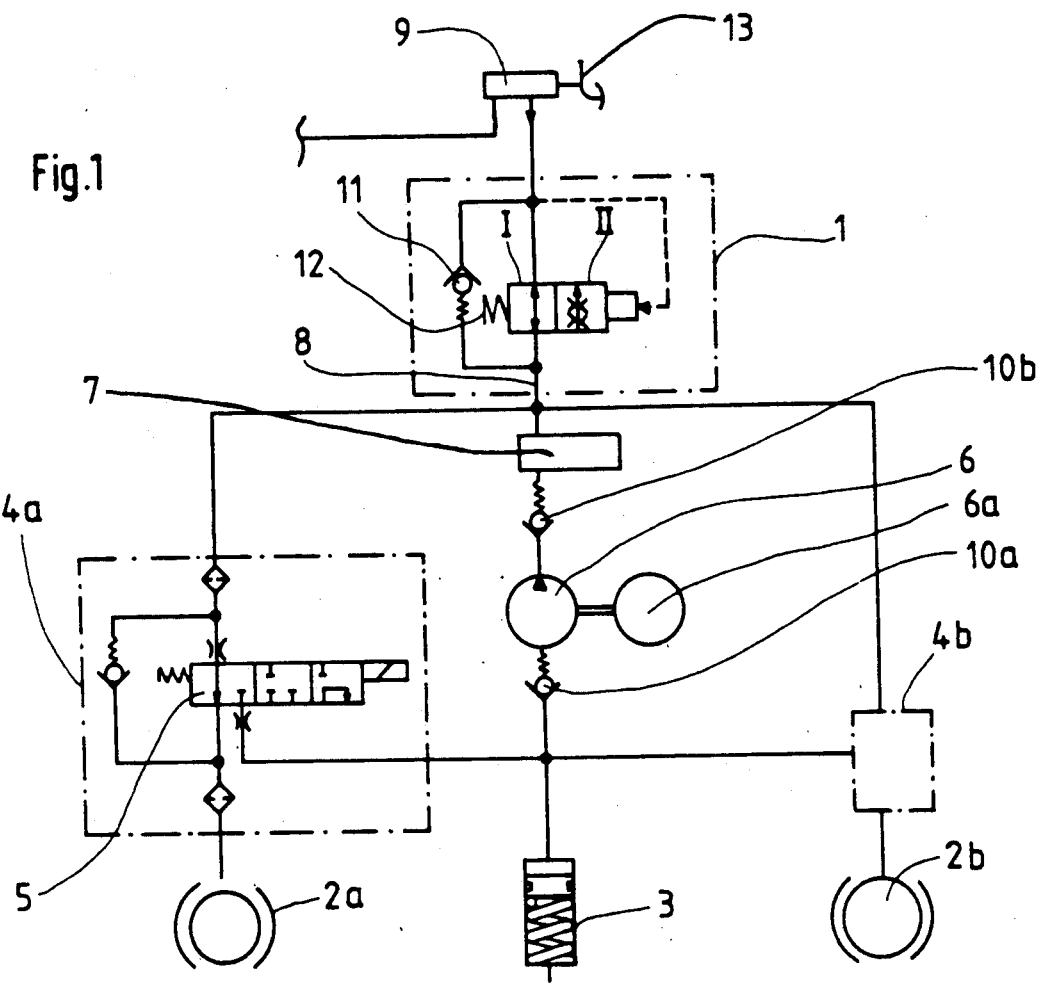
FIG. 1 is a schematic view of an embodiment of an apparatus according to the invention in combination with a motor vehicle brake system with ABS.

The layout for a brake circuit shown in FIG. 1 is very largely equivalent to that of conventional anti-skid systems (ABS) for vehicle brake systems. According to the invention, a throttle switchover valve 1 has been interposed into this layout.

In an ABS control situation, in pressure buildup phase, brake fluid is pumped out of the wheel brake cylinders 2a, 2b into the reservoir chamber 3, via well known regulating valves 4a, 4b. The mode of operation of the regulating valve 4a is shown schematically. The structure of the regulating valve 4b is equivalent and, is merely sketched as shown for the sake of simplicity. The brake fluid is pumped within the regulating valves 4a, 4b via electrically actuated magnetic valves 5. From the reservoir chamber 3, brake fluid in the return direction is pumped by the return pump 6 via the damper chamber 7 into the line 8 to the master cylinder 9 via a throttle switchover valve 1. One-Way check valves 10a, 10b are disposed both between the reservoir chamber 3 and the return pump 6 and between the return pump 6 and the damper chamber 7. The throttle switchover valve 1 includes a one-way bypass valve 11 and a stepped piston, which is moved into a position I or II by a restoring spring 12 as a function of the level of the brake pressure. Position I exists in the unbraked state and with a rapid reduction of brake pressure, while position II occurs upon each braking event, as soon as the brake pressure in the master cylinder attains a level of approximately 10 bar. In position II, the fluid flows through the throttle restriction so that the fluid flow is very slow. In position I, an unthrottled passage for the brake fluid is possible. If the driver should release the brake by means of the foot pedal 13 quickly after a braking event in which a brake pressure of more than 10 bar has been attained and the throttle switchover valve has moved to position II, then the pressure in the master cylinder drops quickly, and because of the higher pressure in the line 8 the switchover valve, is moved by means of the restoring spring 12 from position II to position I so that the brake fluid has a normal fluid flow. In the ABS control situation, at a pressure of more than 10 bar in the master cylinder, the switchover valve is in position II. When the return feed pump 6, which is driven by an electric motor 6a, begins to pump brake fluid back in the return direction, the pressure pulsation is reduced both via the damper chamber 7 and via the pronounced throttling in the switchover valve 1 upstream of the master cylinder 9. A maximally constant pressure flows back to the master cylinder 9 through the throttle restriction in position II. Because of the direct communication with the regulating valves 4a, 4b upstream of the damper chamber 7, upon pressure buildup in the control phase, the return pump 6 pumps directly into the wheel brake cylinders 2a, 2b. If the brake volume in the reservoir chamber 3 is insufficient, then brake fluid can be replenished via the bypass valve 11 from the master cylinder 9 which bypasses the switchover valve 1. When the onset of braking is rapid, the bypass valve 11 likewise guarantees a direct pumping of brake pressure in every braking phase.

Figure 2:
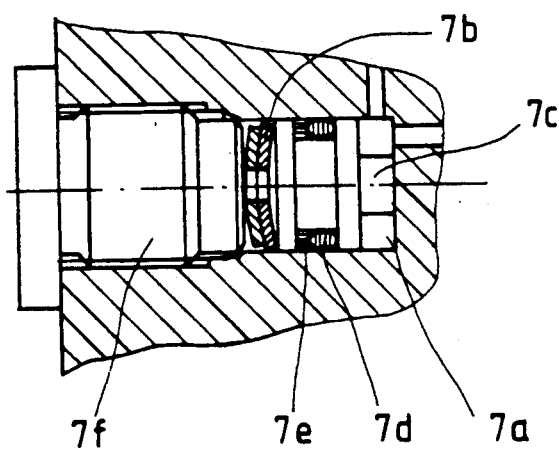
FIG. 2 shows a spring accumulator and damper chamber in cross section, seen from the side.

To enable reducing the pressure pulsation, the damper chamber 7 would have to have a large enough volume to compensate for fluctuations via the compressibility of the pressure medium. According to the invention, as shown in FIG. 2, instead of providing a larger volume for the damper chamber 7a, a spring accumulator is provided, which is pre-stressed to approximately 130 bar (anti-skid pressure), for instance, via a very rigid spring and executes only a very short stroke in order to compensate for the volumetric and pressure pulsations of the return pump, not visible in the drawing, FIG. 2. The compression spring 7b may for instance be a cup spring assembly, which acts upon a piston 7c that is sealed off by an O ring 7d and support ring 7e. A closure screw 7f closes off the housing bore. The spring accumulator is very highly pre-stressed, so that no brake volume will be lost during normal braking.

Figure 3:
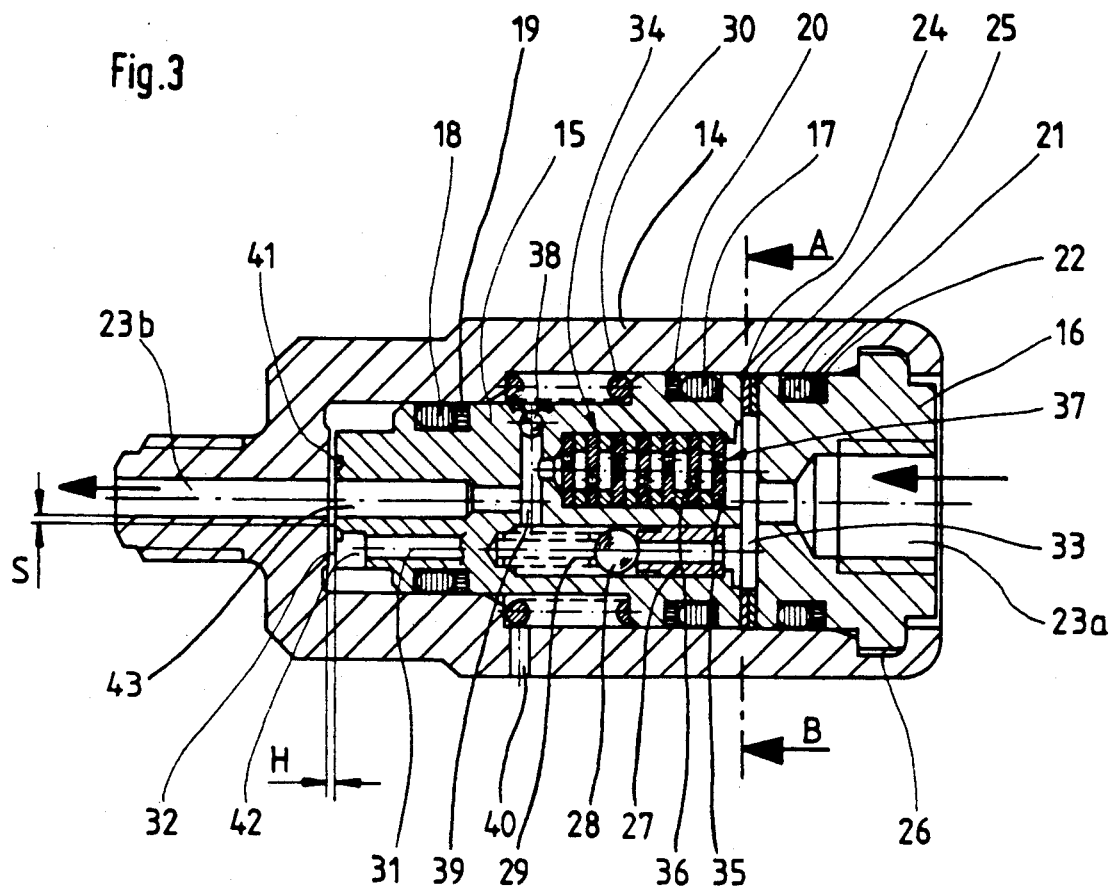
FIG. 3 is a cross sectional view of a throttle switchover valve.

FIG. 3 is a cross sectional view showing the housing 14 of the pressure switchover valve 1 the housing 14 includes a stepped bore, in which a stepped piston 15 and a cap element 16 are located. The stepped piston 15 is guided with the O-rings 17, 18 and the support rings 19, 20 in the housing 14 of the throttle switchover valve 1. The cap element 16 likewise has an O ring 21 and a support ring 22 and closes off the housing bore which is connected via a line to the master cylinder. Via shims 24 and 25, a defined stroke H (for instance 0.4 mm) is set. The cap element 16 is profiled at its collar 26 and is fitted and wedged onto the housing in such a way that it is fixed against relative rotation. A bypass valve within the switchover valve is embodied by a fitted-in valve seat 27, a ball 28 and a compression spring 29. The valve seat 27 is wedged and fixed in place within the housing. The bypass valve is represented by reference character 11 in FIG. 1. By means of a compression spring 30, the stepped piston 15, at its stop on the right, is in contact with the shims 24 and 25 and thus is equivalent to the position I shown in FIG. 1. Via a longitudinal bore 31 and the spacing 32 that is formed by the stroke H, a free flow passage of brake fluid to the wheel cylinders is opened up, which is represented by the arrow in this region in the drawing. If a pressure of approximately 10 bar prevails in the chamber 33, then the stepped piston 15 moves to the left and closes off the passage through the spacing 32. The only communication in the direction of the return pump that now exists toward the master cylinder connection is via the throttle assembly 34. In this case, the throttle switchover valve is in the position shown as switching position II in FIG. 1. The throttle assembly 34 comprises seven throttle disks 35 and six support spacers 36 that separate the throttle disks. These may be made of steel or any other suitable material. The throttle assembly 34 is wedged and fixed in place in the stepped piston 15. By means of the throttle assembly 34, a relatively pronounced throttling action can be attained. The total opening area of the throttle bores 37 may be selected to be larger than when only one bore is used, because seven throttle bores with a total mean size area of 0.5 mm can replace one throttle bore having a total mean size area of 0.3 mm. This makes the throttle bores 37 less sensitive to dirt. A fitted-in and wedged-in ball 38 closes off the transverse bore 39. The bore 40 is a relief bore. As a result of an annular groove 41 on the lefthand end of the stepped piston 15 and the partial countersunk region 42, a spacing 32 exists even in the slightest movements of the stepped piston 15 toward the cap element 16, and this spacing opens up the way to the bore 31 which passes in axial alignment through the stepped piston. Because of the annular groove 41, the flat set of the stepped piston 15 is less sensitive to dirt, because in its position in which it rests on the throttle switchover valve housing 14 it has a slight overlap S.

Figure 4:
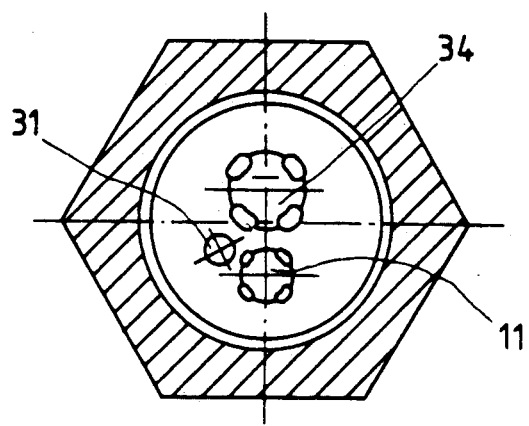
FIG. 4 is a cross sectional view, taken along the line A-B, of the throttle switchover valve shown in FIG. 3.

The cross section through the throttle switchover valve provided in FIG. 4 shows both the bypass valve 11 and the throttle assembly 34. The longitudinal bore 31 is also visible in this drawing.

From the above, it is clearly seen that when the brakes are applied and a pressure greater than 10 bar is built up in the brake system that the piston 15 of the throttle switchover valve is shifted so that fluid has to flow through the throttle assembly 34. As long as the brake pressure is above 10 bar, the piston will remain shifted. Thus, during an ABS situation the brake fluid will flow through the throttle disk 35 to prevent undue fluctuation of brake pressure on master cylinder and brake pedal.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An improved system for pressure regulation in a hydraulic system, in particular in anti-skid systems of vehicle brake systems, which system has a master brake cylinder, a brake pedal for actuating the master brake cylinder, brake lines, at least one wheel brake cylinder, at least one anti-skid regulating valve between the master brake cylinder and the at least one wheel brake cylinder, a reservoir chamber that can be supplied with brake fluid via the anti-skid regulating valve, a reverse feed pump having an inlet check valve that is connected to the reservoir chamber and an outlet check valve, and which contains a damping chamber connected to the outlet check valve and communicating with the master brake cylinder, wherein the improvement comprises a throttle switchover valve (1) disposed between the damping chamber and the master brake cylinder, said throttle switchover valve (1) can be switched over from an open position to a throttle position by means of pressure from the master brake cylinder, a check valve (11) between the master brake cylinder and the at least one anti-skid regulating valve (5), which check valve can be opened by means of pressure in the master brake cylinder in a direction of a connection of the at least one anti-skid regulating valve (5), said check valve forms a one-way bypass around the throttle switchover valve (1) and the direct communication with the damper chamber (7) of the aforementioned connection of the at least one anti-skid regulating valve (5), which communicates with the one-way bypass check valve.

2. An improved system as defined by claim 1, in which said throttle switchover valve (1) is embodied as a line valve.

3. An improved system as defined by claim 1, in which said throttle switchover valve (1) includes a housing (14) which includes housing bores (23a, 23b) for fluid flow connections to the master cylinder (9) and to the damper chamber (7).

4. An improved system as defined by claim 2, in which said throttle switchover valve (1) includes a housing (14) which includes housing bores (23a, 23b) for fluid flow connections to the master cylinder (9) and to the damper chamber (7).

5. An improved system as defined by claim 3, in which said housing bore (23a) is contained in a cap element (16) encompassed by an O-ring (21) and a support ring (22).

6. An improved system as defined by claim 4, in which said housing bore (23a) is contained in a cap element (16) encompassed by an O-ring (21) and a support ring (22).

7. An improved system as defined by claim 5, in which said housing (14) of said throttle switchover valve (1) includes a stepped bore, a stepped piston (15) operable within said stepped bore, said stepped piston having O-rings (17, 18) and support rings (19, 20) encompassing it, said stepped piston is guided slidingly between the cap element (16) and an inner housing wall inwardly of said bore 23a facing it; shims (24, 25) disposed between said cap element (16) and an end of said stepped piston (15.), and a first compression spring (30) is disposed between a shoulder on said stepped piston (15) and a shoulder in said stepped bore of said housing (14).

8. An improved system as defined by claim 6, in which said housing (14) of said throttle switchover valve (1) includes a stepped bore, a stepped piston (15) operable within said stepped bore, said stepped piston having O-rings (17, 18) and support rings (19, 20) encompassing it, said stepped piston is guided slidingly between the cap element (16) and an inner housing wall inwardly of said bore 23a facing it; shims (24, 25) disposed between said cap element (16) and an end of said stepped piston (15), and a first compression spring (30) is disposed between a shoulder on said stepped piston (15) and a shoulder in said stepped bore of said housing (14).

9. An improved system as defined by claim 7, in which said first compression spring forces said stopped piston at a stop against the shims (24, 25), with said piston 15 forced against said shims a spacing 32 is formed between an end of said stepped piston and said inner housing end face of said housing wall, said spacing 32 opens up a free passage to and from said wheel cylinders (2a, 2b) and to and from said master cylinder, and in a reverse direction, via a longitudinal bore (31) in said piston that, assures a free passage through said throttle switchover valve to the said master cylinder.

10. An improved system as defined by claim 8, in which said first compression spring forces said stopped piston at a stop against the shims (24, 25), with said piston 15 forced against said shims a spacing 32 is formed between an end of said stepped piston and said inner housing end face of said housing wall, said spacing 32 opens up a free passage to and from said wheel cylinders (2a, 2b) and to and from said master cylinder, and in a reverse direction, via a longitudinal bore (31) in said piston that, assures a free passage through said throttle switchover valve to the said master cylinder.

11. An apparatus as defined by claim 7, wherein said stepped piston (15), at a stop against said inner housing wall of the throttle switchover valve (1), enables only a throttled fluid flow passage for the brake fluid to the master cylinder.

12. An apparatus as defined by claim 8, wherein said stepped piston (15), at a stop against said inner housing wall of the throttle switchover valve (1), enables only a throttled fluid flow passage for the brake fluid to the master cylinder.

13. An apparatus as defined by claim 7, which includes a bypass valve located in said stepped piston (15), said bypass valve (11) comprises a valve seat (27) wedged into the stepped piston (15), a ball (2B) movable in a bore against said valve seat and a second compression spring (29) which applies a return force on said ball, and said bypass valve discharges into a longitudinal bore (43) extending in the stepped piston (15).

14. An apparatus as defined by claim 8, which includes a bypass valve located in said stepped piston (15), said bypass valve (11) comprises a valve seat (27) wedged into the stepped piston (15), a ball (28) movable in a bore against said valve seat and a second compression spring (29) which applies a return force on said ball, and said bypass valve discharges into a longitudinal bore (43) extending in the stepped piston (15).

15. An apparatus as defined by claim 7, which includes a throttle assembly (34) supported in said stepped piston (15) said throttle assembly (34) includes a plurality of throttle disks (35) separated by support disks (36) and is wedged in its entirety into the stepped piston (15), and each of said throttle disks include a plurality of throttle bores (37) which permits fluid flow therethrough which discharges into a transverse bore (39) extending in the stepped piston (15), which transverse bore is closable on one end by means of a fitted-in and wedged-in ball (38) and discharges into a longitudinal bore (43) that extends in the stepped piston (15) as far as its face end remote from the cap element (16).

16. An apparatus as defined by claim 8, which includes a throttle assembly (34) supported in said stepped piston (15) said throttle assembly (34) includes a plurality of throttle disks (35) separated by support disks (36) and is wedged in its entirety into the stepped piston, (15), and each of said throttle disks include a plurality of throttle bores (37) which permits fluid flow therethrough which discharges into a transverse bore (39) extending in the stepped piston (15), which transverse bore is closable on one end by means of a fitted-in and wedged-in ball (38) and discharges into a longitudinal bore (43) that extends in the stepped piston (15) as far as its face end remote from the cap element (16).

17. An apparatus as defined by claim 7, in which on its face end remote from the cap element (16), the stepped piston (15) has an annular groove (41) which communicates by means of a countersunk portion (42) with said longitudinal bore (31).

18. An apparatus as defined by claim 8, in which on its face end remote from the cap element (16), the stepped piston (15) has an annular groove (41) which communicates by means of a countersunk portion (42) with said longitudinal bore (31).

19. An apparatus as defined by claim 1, which includes a stiff spring (7b) within said damper chamber, said stiff spring is embodied as a cup spring assembly and acts upon an accumulator piston (7c) which passes though the damper chamber and said accumulator piston is sealed off by an O-ring (7d) and a support ring (7e).

20. An apparatus as defined by claim 19, in which said stiff spring (7b) is pre-stressed to an anti-skid pressure of a the brake system.

21. An improved system as set forth in claim 7 in which said damper chamber (7) includes a prestressed spring accumulator.

22. An improved system as set forth in claim 8 in which said damper chamber (7) includes a prestressed spring accumulator.

23. An improved system as set forth in claim 21 in which said prestressed spring accumulator is prestressed to approximately 130 bar.

24. An improved system as set forth in claim 22 in which said prestressed spring accumulator is prestressed to approximately 130 bar.

* * * * *